United States Patent [19]

Peng et al.

[11] Patent Number: 5,681,198
[45] Date of Patent: Oct. 28, 1997

[54] VACUUM SEAL METHOD FOR CATHODE RAY TUBES

[75] Inventors: Chao-Chi Peng, Hsinchu, Taiwan; Lyuji Ozawa, Hopewell Junction, N.Y.

[73] Assignee: Industrial Technology Research Institute, Hsinchu, Taiwan

[21] Appl. No.: 730,044

[22] Filed: Oct. 15, 1996

[51] Int. Cl.$^6$ ............................................. C03C 27/10
[52] U.S. Cl. ........................ 445/43; 65/32.2; 65/34; 65/42; 65/43; 445/45
[58] Field of Search ......................... 65/32.2, 33.6, 65/34, 42, 43, 56, 138, 155, 270; 445/43, 45

[56] References Cited

U.S. PATENT DOCUMENTS

| | | | |
|---|---|---|---|
| 2,301,940 | 11/1942 | Fries | 65/32.2 |
| 3,250,605 | 5/1966 | Matsumoto et al. | 65/41 |
| 3,460,879 | 8/1969 | Fletcher et al. | 445/43 |
| 3,913,194 | 10/1975 | Krause | 445/34 |
| 3,967,871 | 7/1976 | Kerekes | 445/9 |
| 4,071,058 | 1/1978 | Albertin et al. | 141/65 |
| 4,165,227 | 8/1979 | Nubani et al. | 65/56 |
| 4,574,008 | 3/1986 | Kobayashi | 65/155 |
| 4,622,084 | 11/1986 | Chang et al. | 156/89 |
| 4,793,845 | 12/1988 | Fitzke et al. | 65/105 |
| 5,349,217 | 9/1994 | Boysel | 257/266 |

FOREIGN PATENT DOCUMENTS 47-28000  7/1972  Japan.

Primary Examiner—Donald E. Czaja
Assistant Examiner—Sean Vincent
Attorney, Agent, or Firm—George O. Saile; Stephen B. Ackerman; Larry J. Prescott

[57] ABSTRACT

A method of evacuating and sealing a cathode ray tube, CRT, using softened glass frit to seal the exhaust hole through which the CRT is evacuated. A three way branch tube allows a shaft driven by a linear motion means to cover the exhaust hole with a sealing plug or plate and softened vitreous glass frit while the CRT is being evacuated. In one embodiment a getter is also used. Since the CRT is being evacuated when the vitreous glass frit is softened any gases evolved from the softened glass frit are removed by the vacuum pump and are not a problem to the sealed CRT.

23 Claims, 9 Drawing Sheets

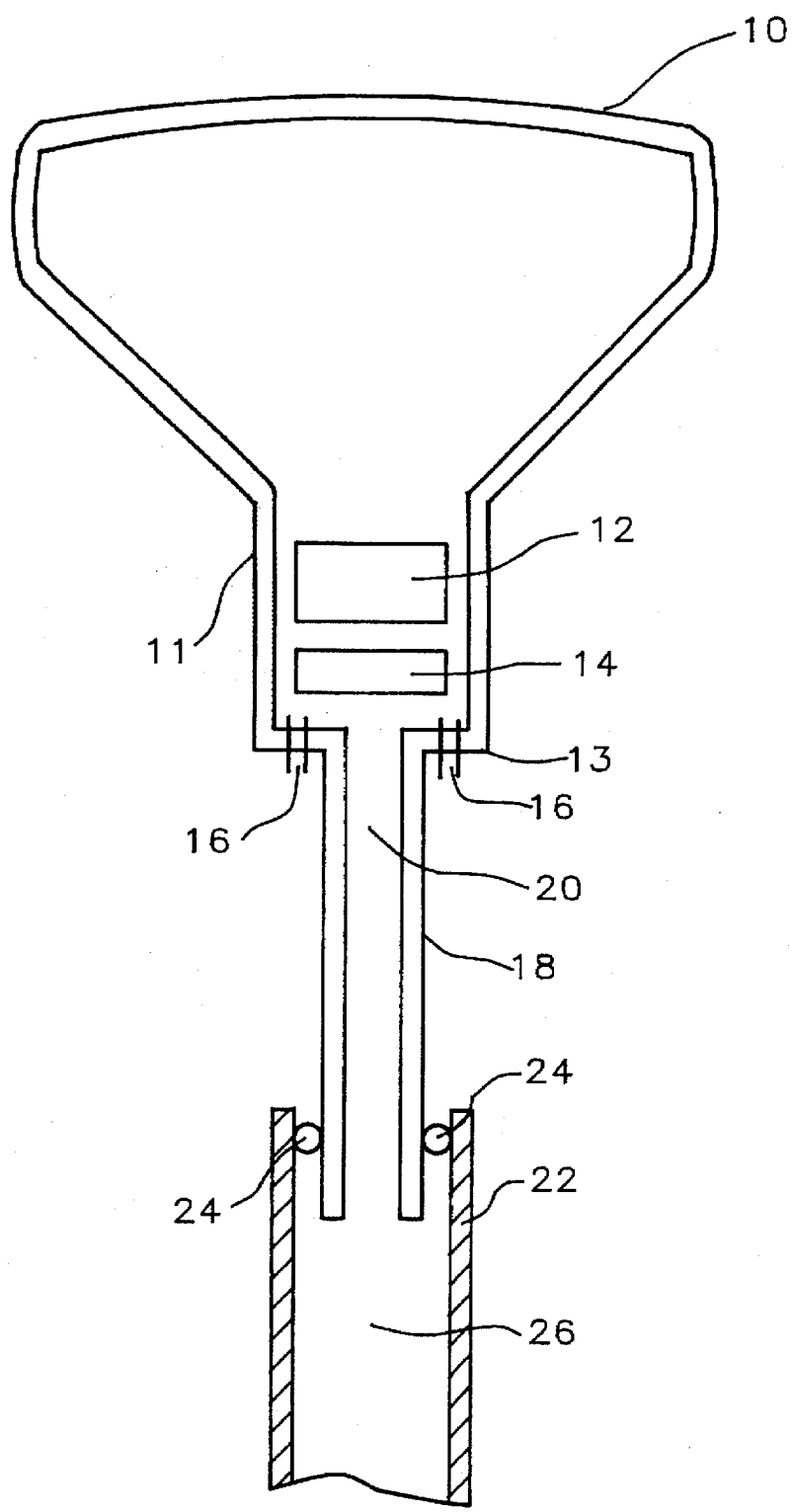
FIG. 1A - Prior Art

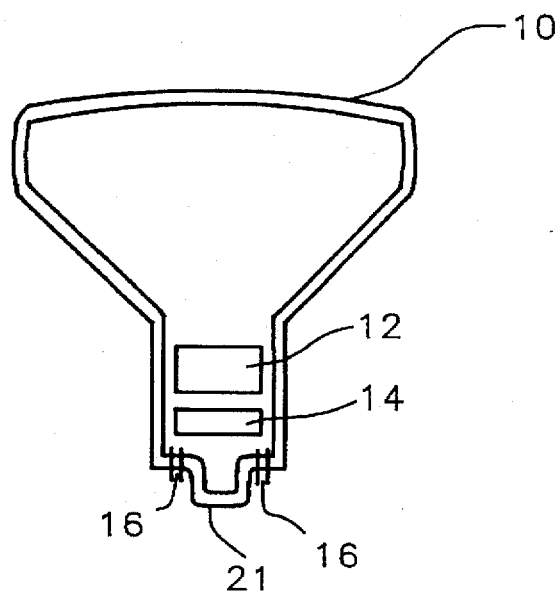
*FIG. 1B - Prior Art*
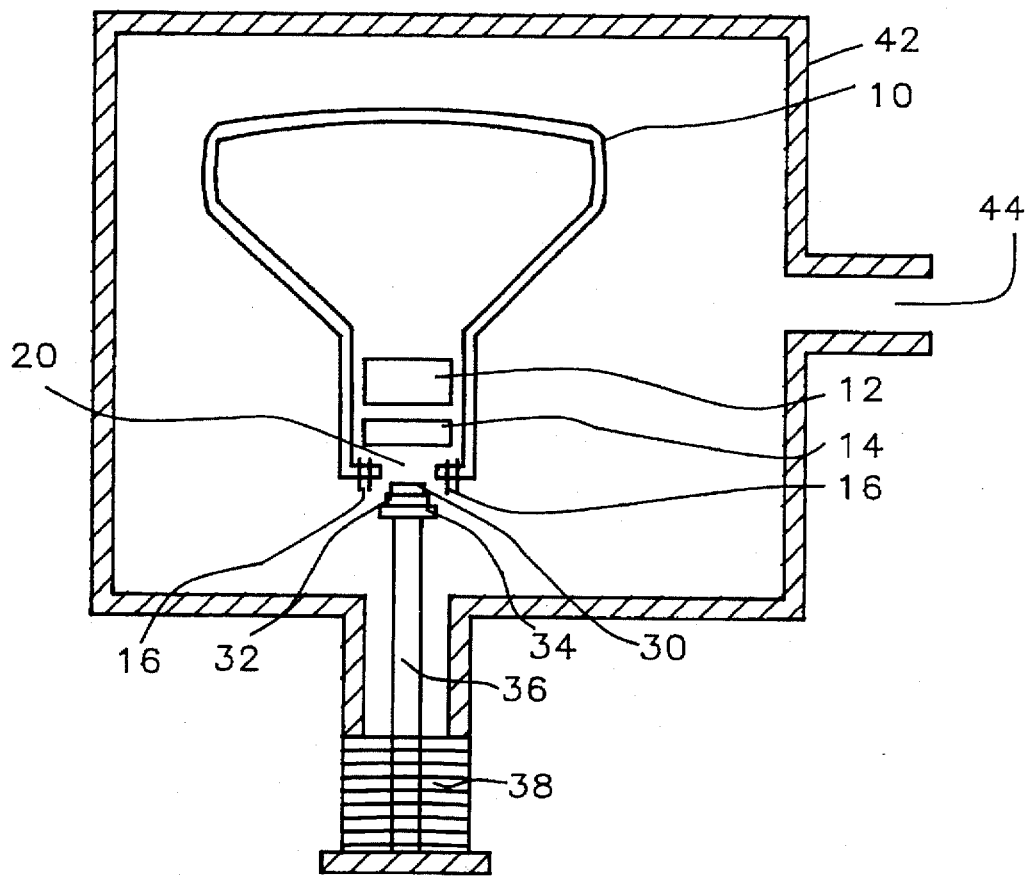
*FIG. 2A - Prior Art*

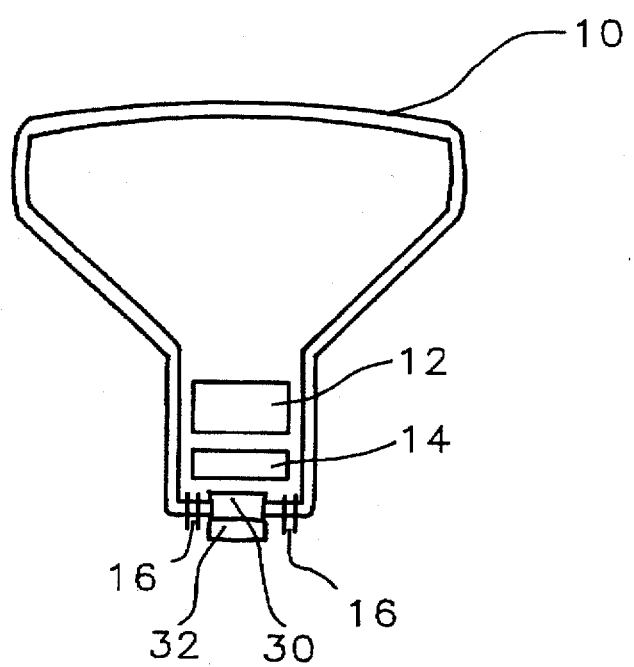
FIG. 2B – Prior Art

VACUUM SEAL METHOD FOR CATHODE RAY TUBES

RELATED PATENT APPLICATION

Ser. No. 08/606,123, Filed Feb. 23, 1996, entitled HYBRID TUBELESS SEALING PROCESS FOR FLAT PANEL DISPLAYS by C. C. Peng.

BACKGROUND OF THE INVENTION

(1) Field of the Invention

The invention relates to a method of evacuating and sealing cathode ray tubes using a glass sealing plug and molten vitreous glass frit to seal the plug in place. The sealing is carried out in an oven with the cathode ray tube being evacuated by a vacuum pump until sealed.

(2) Description of the Related Art

U.S. Pat. No. 4,071,058 to Albertin et al. describes a two stage pumping unit for evacuating television tubes. The pumping unit consists of an air-cooled mechanical pump which is connected in series with an oil diffusion pump. The method of sealing and maintaining a leak free seal was not discussed.

U.S. Pat. No. 5,349,217 to Boysel describes a method of producing a vacuum microelectronic device using known semiconductor process technology with multiple organic spacers. The device is usable as a diode or triode. This method is different process than that of sealing a cathode ray tube.

This Patent application describes a method for sealing cathode ray tubes using a sealing plug coated with vitreous glass frit and a three way branch tube to provide for evacuating the cathode ray tube until it is sealed. Only the vitreous glass frit melts during the sealing process.

SUMMARY OF THE INVENTION

Cathode Ray Tubes have a wide use as computer system displays as well as a number of other displays. To insure proper operation of the display tube and to achieve a reasonable life the tubes must be evacuated prior to sealing the tubes. Conventional methods of evacuating and sealing cathode ray tubes have resulted in a number of problems.

FIG. 1A shows a conventional method of evacuating and sealing a cathode ray tube. FIG. 1A shows a diagram of a cathode ray tube 10 having a neck 11 and a base 13. The cathode ray tube, CRT, has a cathode 14 and electron gun 12 in the neck 11 of the CRT. There are a number of pins 16 sealed in the base 13 of the CRT for making electrical connections with the filament, cathode, and electron gun. There is an exhaust hole 20 in the base of the CRT and an exhaust tube 18 is sealed to the base of the CRT covering the exhaust hole 20. The exhaust tube 18 is sealed to a pumping tube 22 by means of an O ring seal 24. The pumping tube 22 is attached to a vacuum pump, not shown, and the interior of the pumping tube 26 is evacuated which in turn evacuates the CRT. After the CRT has been evacuated the glass exhaust tube 18 is heated near the base 13 of the CRT sufficiently to soften a part of the exhaust tube 18 which is then formed so as to seal the exhaust hole 20. The excess exhaust tube is removed. FIG. 1B. shows the seal 21 over the exhaust hole in the completed CRT.

There are some problems with the conventional method of sealing a CRT just described. When the glass exhaust tube 18 is heated to seal the exhaust hole 20 the glass of the exhaust tube discharges gasses which are then sealed inside the CRT. These gasses will raise the pressure in the CRT and will adversely affect the life and operating characteristics of the CRT. The C-H gasses are trapped in the CRT which can not be absorbed by barium used in the cathode.

FIG. 2A shows another conventional method of sealing a CRT. In this method the CRT 10 is enclosed in a vacuum furnace 42 having a connection 44 to a vacuum pump, not shown. The CRT 10 has pins 16 sealed in the base 13, a cathode 14, and an electron gun 12 as described previously. There is an exhaust hole 20 in the base 13 of the CRT 10. The second end of a shaft 36, having a first end and a second end, is connected to a means for providing linear motion 38. A base plate 34 is attached to the first end of the shaft 36. The second surface of a glass sealing plate 32, having a first surface and a second surface, is placed on the base plate 34. Vitreous glass frit 30 is placed on the first surface of the sealing plate. The vacuum furnace is heated sufficiently to melt the vitreous glass frit 30 and to evacuate the CRT. The linear motion means then pushes the melted glass frit 30 and the sealing plate up to the exhaust hole, the furnace is allowed to cool, and the glass frit solidifies sealing the sealing plate over the exhaust hole, see FIG. 2B.

The vacuum furnace method of evacuating and sealing a CRT avoids the problems of the previously described conventional method but it is a batch process method and is slow and expensive.

It is an objective of this invention to provide a low cost method of sealing a cathode ray tube which provides a good vacuum and avoids undesirable gasses in the sealed cathode ray tube.

These objectives are achieved by using a three way extension tube in the evacuation of the CRT and vitreous glass frit in the sealing of the CRT. In the actual sealing process only the vitreous glass frit melts and any gasses evolved are removed by the vacuum pump before the CRT is sealed. A vacuum furnace is not required. Heat is supplied by a furnace which does not require batch type operation.

In one of the embodiments a getter is used and heat is also supplied by a radio frequency, RF, coil and electrical power to the filaments in the CRT.

BRIEF DESCRIPTION OF THE DRAWINGS

FIG. 1A shows a diagram of a conventional method of evacuating and sealing a cathode ray tube.

FIG. 1B shows a diagram of the evacuated and sealed cathode ray tube of FIG. 1A.

FIG. 2A shows a diagram of a conventional vacuum furnace method of evacuating and sealing a cathode ray tube.

FIG. 2B shows a diagram of the evacuated and sealed cathode ray tube of FIG. 2A.

DESCRIPTION OF THE PREFERRED EMBODIMENTS

Figure 3:
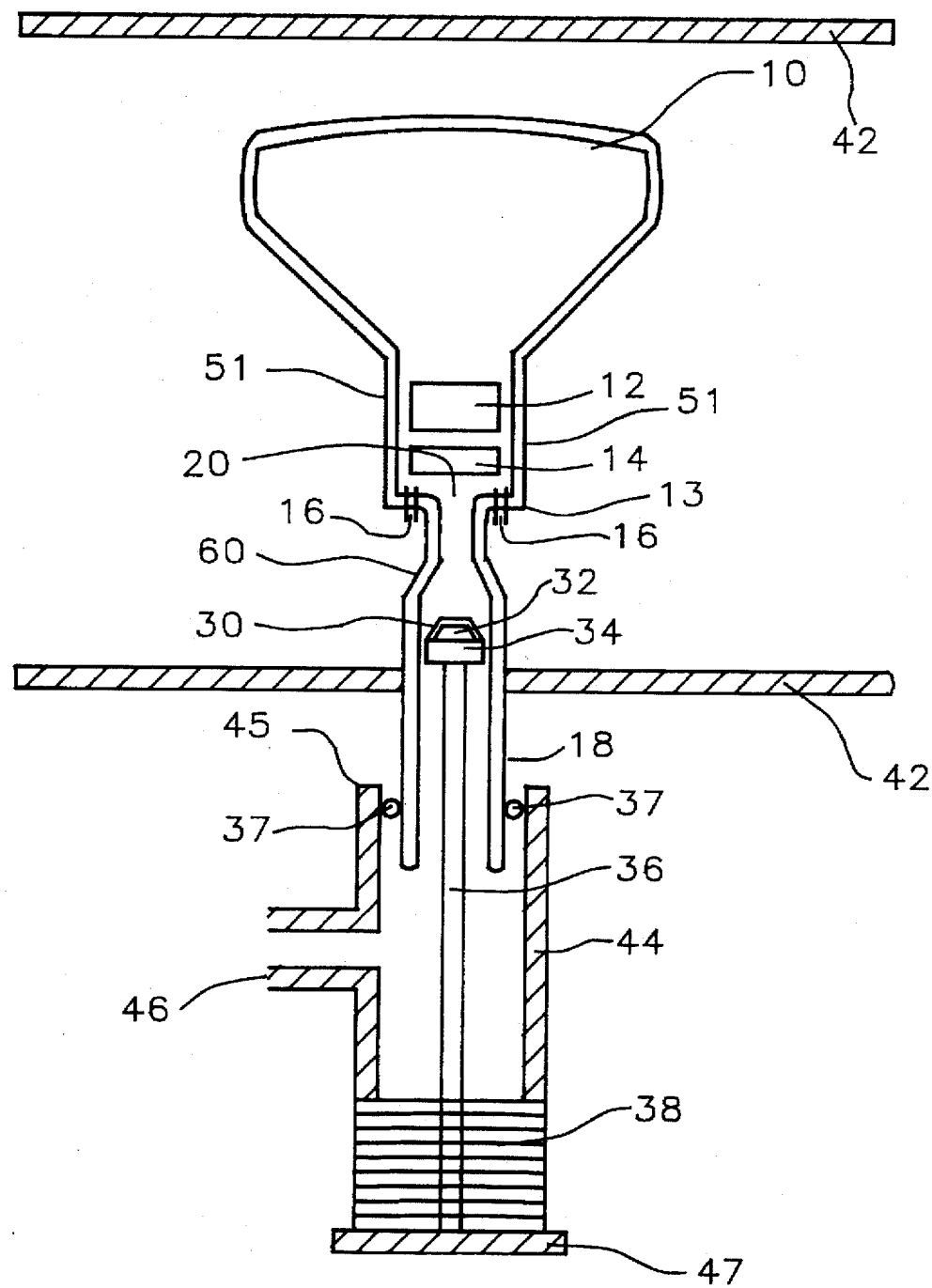
FIG. 3 shows a diagram of one method of this invention of evacuating and sealing a cathode ray tube.
Figure 4:
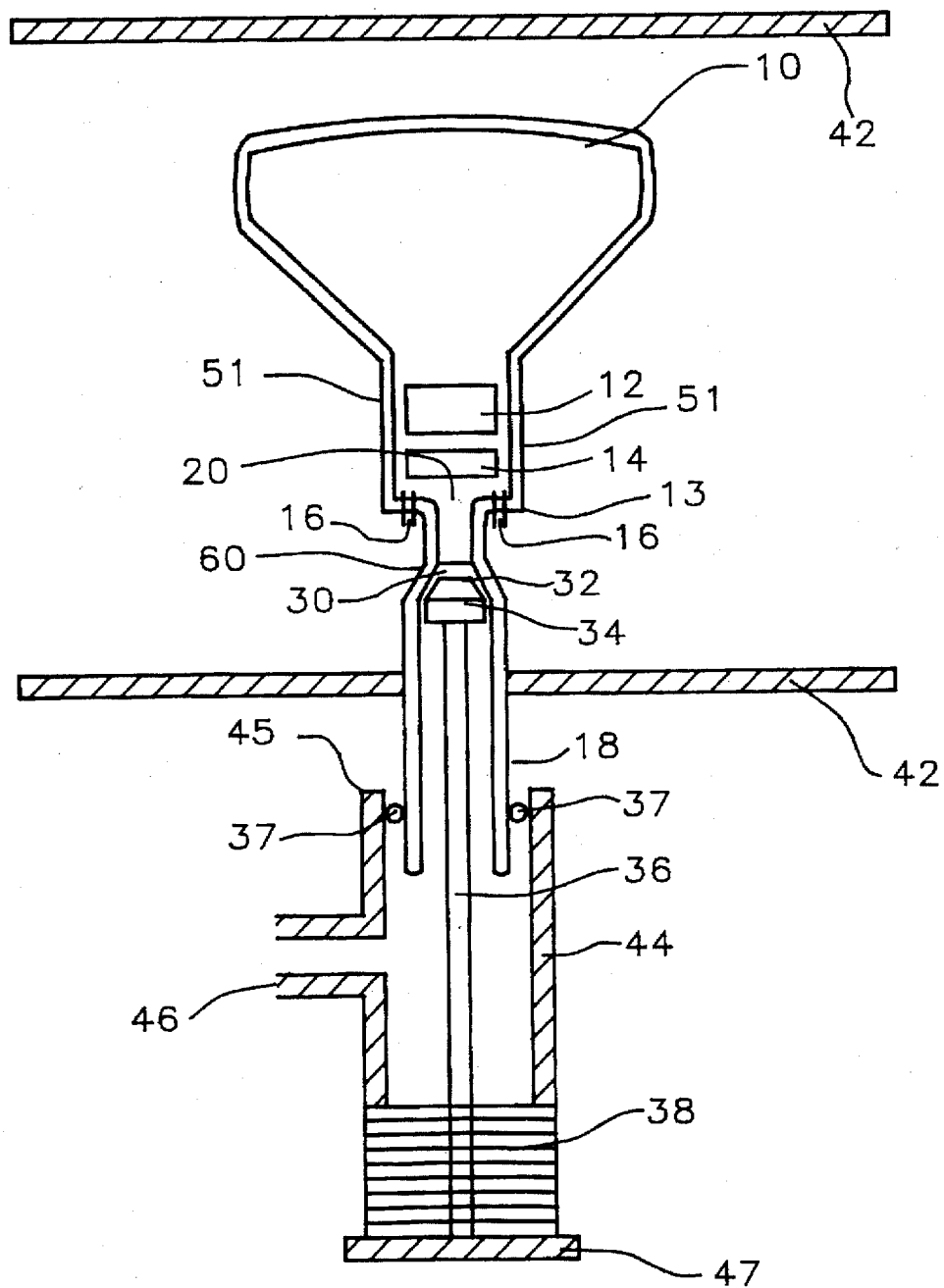
FIG. 4 shows a diagram of the cathode ray of FIG. 3 with the sealing plug in final position.
Figure 5:
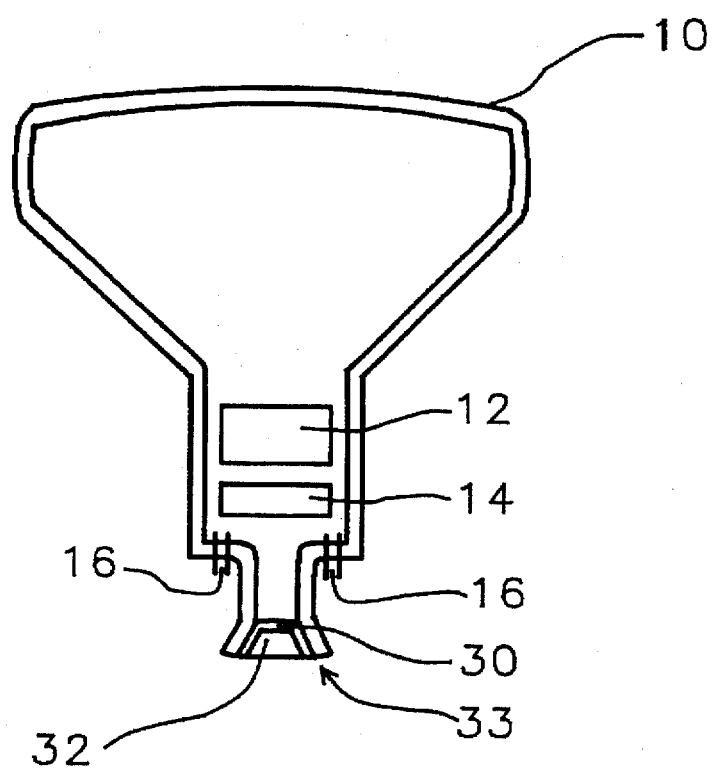
FIG. 5 shows a diagram of the evacuated and sealed cathode ray tube of FIG. 3.

Refer now to FIGS. 3-5, there is shown a preferred embodiment of the method of evacuating and sealing a cathode ray tube, CRT, of this invention. In this example the CRT is glass. FIG. 3 shows a diagram of a CRT 10 having a neck 51 and a base 13. The CRT 10 has a cathode 14 and an anode 12. A filament, not shown, is part of the cathode 14. Pins 16 are sealed in the base 13 and enable electrical connection to be made to components in the interior of the CRT, such as the filament, cathode, and anode. There is an exhaust hole 20, having a diameter of between about 3 and 5 millimeters in the base of the CRT. The first end of an exhaust tube 18, having a first end and a second end, has a tapered section 60 and is sealed to the base 13 of the CRT 10 so that the first end of the exhaust tube 60 covers the exhaust hole 20. The second end of the exhaust tube has a diameter of between about 10 and 20 millimeters. In this example the exhaust tube is glass.

The CRT and the attached exhaust tube are placed in an oven 42 having a hole in one side so that the second end of the exhaust tube 18 extends through the hole in the side of the oven 42. The oven 42 is a high throughput type low cost oven. The second end of the exhaust tube 18 is inserted into the first end of a three way branch tube 44, formed of a material such as stainless steel, having a first end 45, a second end 47, and a third end 46. The second end of the exhaust tube 18 is sealed to the first end 45 of the branch tube 44 by means of an O ring seal 37.

A linear motion means 38, such as a vacuum bellows, is attached to the second end 47 of the branch tube 44. A shaft 36, formed of glass, stainless steel, or the like, is located inside the branch tube 44 and has a first end and a second end. The second end of the shaft 36 is attached to the linear motion means 38 and the first end of the shaft 36 extends through the first end 45 of the branch tube 44 into the exhaust tube 18. A platform 34 is attached to the first end of the shaft 36. The platform 34 can be moved within the exhaust tube 18 by the shaft 36 and the linear motion means 38. A vacuum pump, not shown, is attached to the third end 46 of the branch tube 44.

A tapered sealing plug 32, having a first surface, a tapered surface, and a second surface is placed on the platform 34 so that the second surface of the sealing plug 32 rests on the platform 34. Vitreous glass frit 30 is placed on the first surface and the tapered surface of the sealing plug 32.

The position of the platform 34 is adjusted using the linear motion means 38 so that the exhaust hole 20 is open. The vacuum pump then evacuates the cathode ray tube until a pressure of between about $4 \times 10^{-5}$ and $5 \times 10^{-6}$ torr is reached in the cathode ray tube. The oven temperature is then increased until the temperature of the CRT, the sealing plug 32, and the vitreous glass frit 30 is between about 400° C. and 500° C., wherein the vitreous glass frit 30 softens. As shown in FIG. 4, the position of the platform 34 is then adjusted using the linear motion means 38 until the softened vitreous glass frit 30 contacts the tapered section 60 of the first end of the exhaust tube 18. The tapered section 60 of the first end of the exhaust tube has the same taper angle as the tapered surface of the sealing plug 32. The oven is then allowed to cool and the vitreous glass frit 30 solidifies and seals the exhaust hole 20 with the sealing plug 32 and the solidified vitreous glass frit 30.

The CRT and the exhaust tube is then removed from the oven and the branch tube and the exhaust tube is cut at a point 33 just below the sealing plug, see FIG. 5. The evacuation and sealing of the cathode ray tube is then complete. Since the CRT is still being evacuated when the glass frit is softened any gases evolved from the softened glass frit is not a problem for the sealed CRT.

Figure 6:
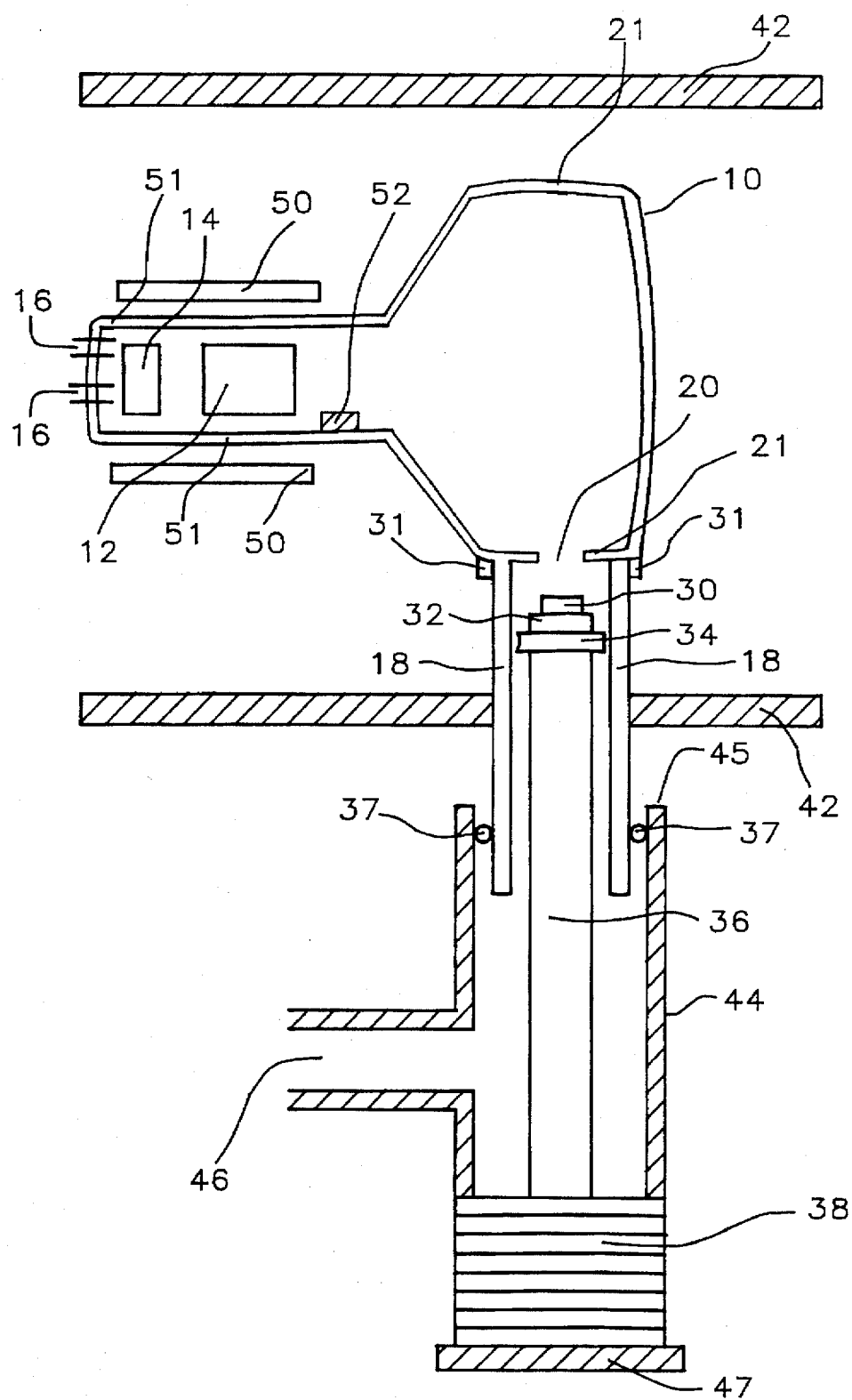
FIG. 6 shows a diagram of a method of this invention of evacuating and sealing a cathode ray tube, showing the cathode ray tube in a furnace and an RF coil attached to the cathode ray tube.

Refer now to FIGS. 6-9, there is shown another embodiment of a method of evacuating and sealing a cathode ray tube. FIG. 6 shows a diagram of a glass CRT 10 having a neck 51, a base 13, and a sidewall 21. A cathode 14, an anode 12, and a getter 52 are formed in the neck 51 of the CRT 10. In this example the getter 52 is barium. A filament, not shown, is part of the cathode 14. Pins 16 are sealed in the base 13 and enable electrical connection to be made to components in the interior of the CRT, such as the filament, cathode, and anode. There is an exhaust hole 20 in the sidewall 21 of the CRT having a diameter of between about 3 and 5 millimeters. The first end of a glass exhaust tube 18, having a first end and a second end, is sealed to the exterior of the sidewall 21 covering the exhaust hole 20 using devitrified glass 31. The glass exhaust tube has a diameter of between about 10 and 20 millimeters.

A radio frequency, RF, coil 50 is placed around the neck 51 of the CRT 10. The CRT, the attached exhaust tube 18, and the RF coil 50 are then placed in an oven 42 having a hole in one side so that the second end of the exhaust tube 18 extends through the hole in the side of the oven 42. The oven 42 is a high throughput type low cost oven. The second end of the exhaust tube 18 is inserted into the first end 45 of a three way branch tube 44, formed of a material such as stainless steel, having a first end 45, a second end 47, and a third end 46. The second end of the exhaust tube 18 is sealed to the first end 45 of the branch tube 44 by means of an O ring seal 37.

A linear motion means 38, such as a vacuum bellows or magnetically coupled vacuum feed-through, is attached to the second end 47 of the branch tube 44. A shaft 36, formed of glass, stainless steel, or the like, is located inside the branch tube 44 and has a first end and a second end. The second end of the shaft 36 is attached to the linear motion means 38 and the first end of the shaft 36 extends through the first end 45 of the branch tube 44 into the exhaust tube 18. A platform 34 is attached to the first end of the shaft 36. The platform 34 can be moved within the exhaust tube 18 by the shaft 36 and the linear motion means 38. A vacuum pump, not shown, is attached to the third end 46 of the branch tube 44.

A sealing plate 32, having a first surface and a second surface is placed on the platform 34 so that the second surface of the sealing plate 32 rests on the platform 34. Vitreous glass frit 30 is placed on the first surface of the sealing plate 32.

The position of the platform 34 is adjusted using the linear motion means 38 so that the exhaust hole 20 is open. The vacuum pump then evacuates the cathode ray tube until a pressure of between about $1 \times 10^{-5}$ and $5 \times 10^{-6}$ torr is reached in the cathode ray tube. The oven temperature is then raised so that the temperature of the CRT, the sealing plate 32 and the vitreous glass frit 30 is between about 400° C. and 500° C. for between about 25 and 35 minutes. This softens the vitreous glass frit. Next electrical power is applied to the filament, which is part of the cathode 14, raising the temperature of the cathode to between about 900° C. and 1000° C. This temperature activates the cathode by changing $BaCO_3$ and $SrCO_3$ on the cathode to BaCO and SrO, and giving off carbon dioxide which is removed by the vacuum pump. The electrical power is then removed from the filament.

Figure 7:
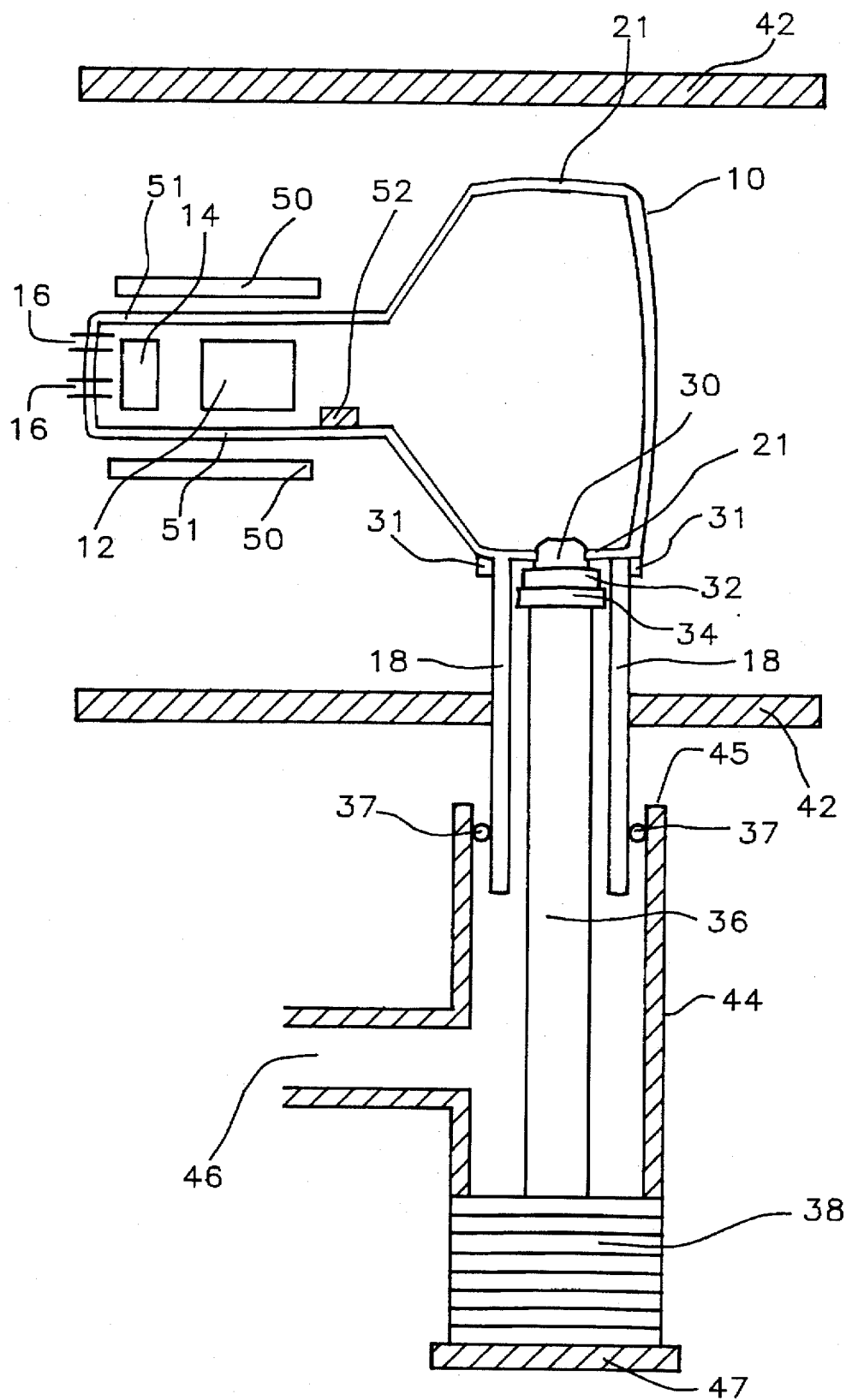
FIG. 7 shows a diagram of the cathode ray tube in a furnace with the RF coil attached after sealing the exhaust hole.

Next the RF coil is energized and heats the barium getter 52 and the electron gun 12 to between about 700° C. and 900° C. for between about 1 and 10 seconds. Then, as shown in FIG. 7, the position of the sealing plate 32 and the softened vitreous glass frit 30 is adjusted using the linear motion means 38 so that the softened vitreous glass frit 30 contacts the exhaust hole 20 and the sealing plate 32 covers the exhaust hole 20. Power is then removed from the oven 42 and the RF coil 50 and the CRT 10, sealing plate 32, vitreous glass frit 30, and exhaust tube 18 are allowed to cool to about 150° C. or less thereby solidifying the vitreous glass frit 30.

Figure 8:
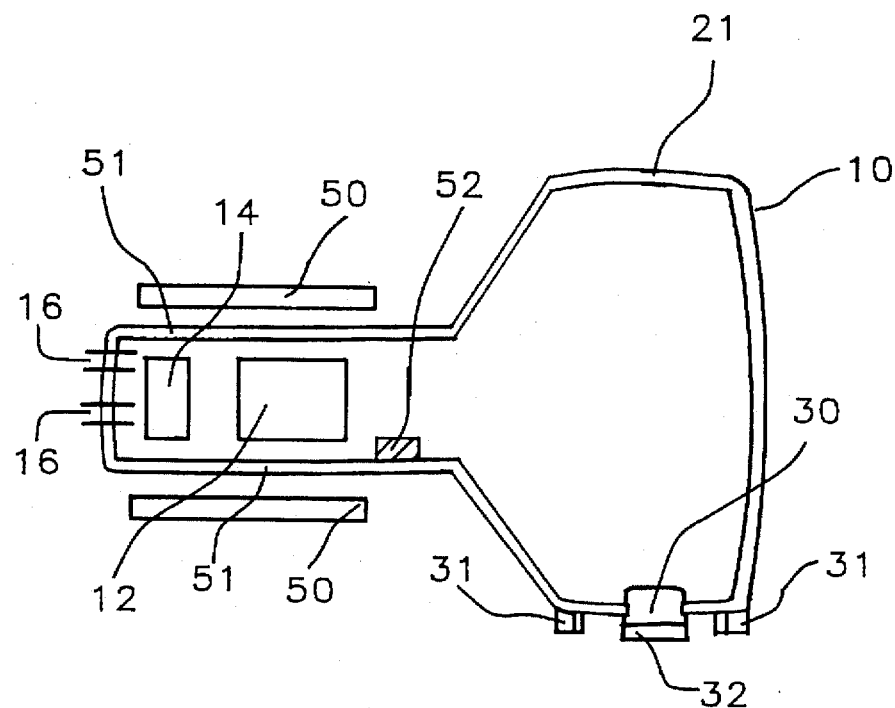
FIG. 8 shows a diagram of the cathode ray tube removed from the furnace after the exhaust tube has been cut with the RF coil in place.
Figure 9:
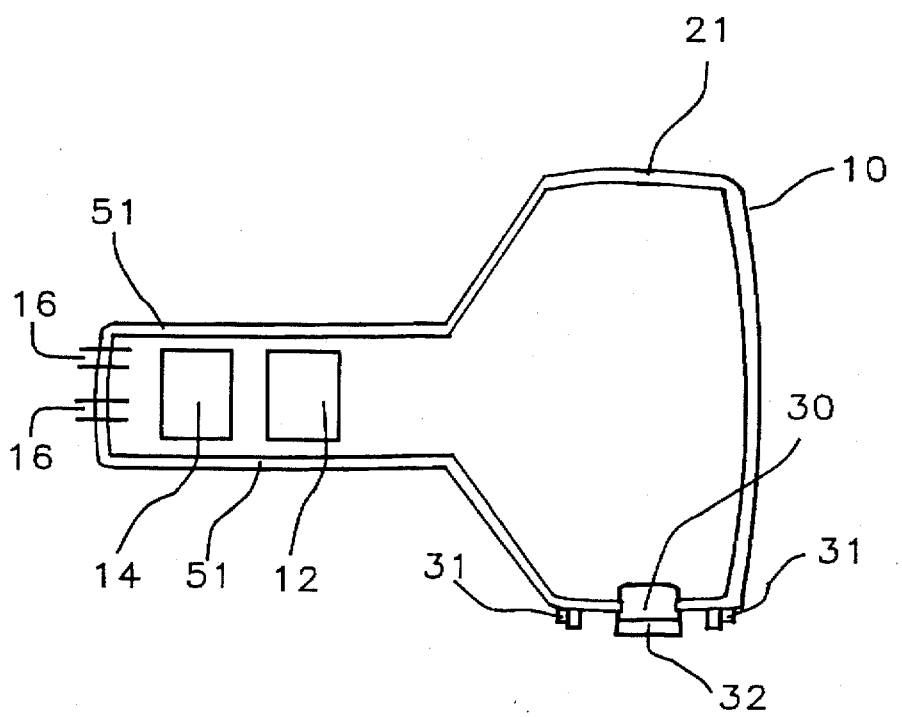
FIG. 9 shows a diagram of a sealed and evacuated cathode ray tube with the RF coil removed.

Then, as shown in FIG. 8, the CRT 10 and the exhaust tube 18 are removed from the oven 42 and the branch tube 44 and the RF coil 50 is removed from the neck 51 of the CRT 10. The exhaust tube is then removed from the CRT using cutting and grinding. The RF coil 50 is then reassembled around the neck 50 of the CRT 10. The RF coil 50 is then energized and the barium getter 52 is raised to a temperature of between about 700° C. and 900° C. and evaporated. As shown in FIG. 9, power is then removed from the RF coil and the RF coil is again removed from the neck 51 of the cathode ray tube 10. The evacuation and sealing of the cathode ray tube is then completed.

As in the previous embodiment the glass frit softens while the cathode ray tube is still being evacuated and any gases evolved from the softened glass frit is removed by the vacuum pump and is not a problem to the sealed cathode ray tube. In addition the getter removes any stray gasses sealed in the cathode ray tube.

While the invention has been particularly shown and described with reference to the preferred embodiments thereof, it will be understood by those skilled in the art that various changes in form and details may be made without departing from the spirit and scope of the invention.

What is claimed is:

1. A method of sealing a cathode ray tube, comprising the steps of:

providing a cathode ray tube having a neck, a base, and an exhaust hole in said base, wherein said cathode ray tube is sealed except for said exhaust hole in said base;

providing a cathode, a filament, and an electron gun in said neck of said cathode ray tube and inside said cathode ray tube;

providing pins sealed in said base of said cathode ray tube wherein said pins provide electrical connections to said filament, said cathode, and said electron gun;

providing an oven having walls wherein said oven has an opening in one of said walls;

providing an exhaust tube, external to said cathode ray tube, having a first end and a second end wherein said first end of said exhaust tube has a tapered section;

sealing said first end of said exhaust tube to said base of said cathode ray tube covering said exhaust hole;

providing a three way branch tube having a first end, a second end, and a third end;

providing linear motion means attached to said second end of said branch tube such that said linear motion means seals said second end of said branch tube;

providing a shaft having a first end and a second end wherein said second end of said shaft is attached to said linear motion means and said shaft extends through said first end of said branch tube so that said first end of said shaft is outside said branch tube and said second end of said shaft is inside said branch tube;

placing said cathode ray tube and said exhaust tube inside said oven such that said second end of said exhaust tube extends through said opening in one of said sidewalls of said oven so that said second end of said exhaust tube is outside said oven;

providing a tapered sealing plug having a first surface, a second surface, and a tapered surface wherein said tapered surface of said sealing plug has the same taper angle as said tapered section of said first end of said exhaust tube;

placing said sealing plug on said first end of said shaft wherein said second surface of said sealing plate contacts said first surface of said shaft;

placing vitreous glass frit on said first surface and said tapered surface of said sealing plug;

placing said first end of said shaft inside said exhaust tube after placing said second surface of said sealing plug on said first end of said shaft and said vitreous glass frit on said first surface and said tapered surface of said sealing plug so that said exhaust hole in said base of said cathode ray tube remains open;

placing said second end of said exhaust tube inside said first end of said branch tube;

sealing said first end of said branch tube to said second end of said exhaust tube by means of an O ring seal;

attaching said third end of said branch tube to a vacuum pump;

evacuating said cathode ray tube to a first pressure using said vacuum pump;

heating said cathode ray tube, said sealing plug, and said vitreous glass frit to a first temperature for a first time by supplying power to said oven after reaching said first pressure in said cathode ray tube, thereby softening said vitreous glass frit;

moving said shaft using said linear motion means so that said softened vitreous glass frit contacts both said tapered surface of said sealing plug and said tapered section of said first end of said exhaust tube and said plug covers said exhaust hole;

removing power from said oven thereby cooling said cathode ray tube, said first end of said exhaust tube, said sealing plug, and said vitreous glass frit to a second temperature so that said vitreous glass frit solidifies and said sealing plug and solidified said vitreous glass frit seals said exhaust hole;

removing said first end of said branch tube from said second end of said exhaust tube;

removing said cathode ray tube from said oven; and removing that part of said exhaust tube between said second surface of said sealing plug and said second end of said exhaust tube from said cathode ray tube by means of cutting and grinding.

2. The method of claim 1 wherein said first pressure is between about $1 \times 10^{-5}$ and $5 \times 10^{-6}$ torr.

3. The method of claim 1 wherein said first temperature is between about 400° C. and 500° C.

4. The method of claim 1 wherein said second temperature is less than about 150° C.

5. The method of claim 1 wherein said three way branch tube is stainless steel.

6. The method of claim 1 wherein said exhaust hole has a diameter of between about 3 and 5 millimeters.

7. The method of claim 1 wherein said linear motion means comprises a vacuum bellows or magnetically coupled vacuum feed-through.

8. The method of claim 1 wherein said cathode ray tube is glass.

9. The method of claim 1 wherein said exhaust tube is glass.

10. A method of sealing a cathode ray tube, comprising the steps of:

providing a cathode ray tube having a neck, a base, a transition wall, a sidewall, a front wall, and an exhaust hole in said sidewall, wherein said cathode ray tube is sealed except for said exhaust hole in said sidewall;

providing a cathode, a filament, an electron gun, and a getter in said neck of said cathode ray tube and inside said cathode ray tube;

providing pins sealed in said base of said cathode ray tube wherein said pins provide electrical connections to said filament, said cathode, and said electron gun;

providing an oven having walls wherein said oven has an opening in one of said walls;

providing a radio frequency coil;

providing an exhaust tube having a first end and a second end external to said cathode ray tube wherein said first end of said exhaust tube is sealed to said sidewall of said cathode ray tube by means of devitrified glass such that said first end of said exhaust tube covers said exhaust hole in said sidewall of said cathode ray tube;

providing a three way branch tube having a first end, a second end, and a third end;

providing linear motion means attached to said second end of said branch tube such that said linear motion means seals said second end of said branch tube;

providing a shaft having a first end and a second end wherein said second end of said shaft is attached to said linear motion means and said shaft extends through said first end of said branch tube so that said first end of said shaft is outside said branch tube and said second end of said shaft is inside said branch tube;

placing said cathode ray tube inside said oven such that said second end of said exhaust tube extends through said opening in one of said sidewalls of said oven so that said second end of said exhaust tube is outside said oven;

placing said radio frequency coil around said neck of said cathode ray tube;

placing a sealing plate having a first surface and a second surface on said first end of said shaft where said second surface of said sealing plate contacts said first surface of said shaft;

placing vitreous glass frit on said first surface of said sealing plate;

placing said first end of said shaft inside said exhaust tube after placing said second surface of said sealing plate on said first end of said shaft and said vitreous glass frit on said first surface of said sealing plate so that said exhaust hole in said sidewall of said cathode ray tube remains open;

placing said second end of said exhaust tube inside said first end of said branch tube;

sealing said first end of said branch tube to said second end of said exhaust tube by means of an O ring seal;

attaching said third end of said branch tube to a vacuum pump;

evacuating said cathode ray tube to a first pressure using said vacuum pump;

heating said cathode ray tube to a first temperature for a first time by supplying power to said oven after reaching said first pressure in said cathode ray tube thereby softening said vitreous glass frit;

providing electrical current to said filament using said electrical contacts sealed in said base of said cathode ray tube thereby raising the temperature of said cathode to a second temperature;

removing electrical current from said filament;

heating said getter and said electron gun to a third temperature for a second time by supplying power to said radio frequency coil;

moving said shaft using said linear motion means so that said softened vitreous glass frit contacts said exhaust hole and said first surface of said sealing plate covers said exhaust hole after heating said getter and said electron gun to said third temperature for said second time;

removing power from said oven after said softened vitreous glass frit contacts said exhaust hole and said first surface of said sealing plate covers said exhaust hole thereby cooling said cathode ray tube and said vitreous glass frit to a fourth temperature so that said vitreous glass frit solidifies, and said sealing plate and said solidified vitreous glass frit seals said exhaust hole;

removing said first end of said branch tube from said second end of said exhaust tube;

removing said cathode ray tube from said oven;

removing said radio frequency coil from said neck of said cathode ray tube;

removing said exhaust tube from said cathode ray tube by means of cutting and grinding;

replacing said radio frequency coil around said neck of said cathode ray tube after removing said exhaust tube;

heating said getter to a fifth temperature by supplying power to said radio frequency coil thereby evaporating said getter;

removing power from said radio frequency coil; and removing said radio frequency coil from said neck of said cathode ray tube.

11. The method of claim 10 wherein said first pressure is between about $1 \times 10^{-5}$ and $5 \times 10^{-5}$ torr.

12. The method of claim 10 wherein said first temperature is between about 400° C. and 500° C.

13. The method of claim 10 wherein said first time is between about 25 and 35 minutes.

14. The method of claim 10 wherein said second temperature is between about 900° C. and 1000° C.

15. The method of claim 10 wherein said third temperature is between about 700° C. and 900° C.

16. The method of claim 10 wherein said second time is between about 1 and 10 seconds.

17. The method of claim 10 wherein said fourth temperature is less than 150° C.

18. The method of claim 10 wherein said fifth temperature is between about 700° C. and 900° C.

19. The method of claim 10 wherein said three way branch tube is stainless steel.

20. The method of claim 10 wherein said exhaust hole has a diameter of between about 3 and 5 millimeters.

21. The method of claim 10 wherein said linear motion means comprises a vacuum bellows or magnetically coupled vacuum feed-through.

22. The method of claim 10 wherein said cathode ray tube is glass.

23. The method of claim 10 wherein said exhaust tube is glass having a diameter of between about 10 and 20 millimeters.

* * * * *